US007286143B2

(12) United States Patent
Kang et al.

(10) Patent No.: US 7,286,143 B2
(45) Date of Patent: Oct. 23, 2007

(54) INTERACTIVE VIEWPOINT VIDEO EMPLOYING VIEWPOINTS FORMING AN ARRAY

(75) Inventors: Sing Bing Kang, Redmond, WA (US); Charles Zitnick, III, Seattle, WA (US); Matthew Uyttendaele, Seattle, WA (US); Simon Winder, Seattle, WA (US); Richard Szeliski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 183 days.

(21) Appl. No.: 11/097,542

(22) Filed: Mar. 31, 2005

(65) Prior Publication Data
US 2005/0286759 A1 Dec. 29, 2005

Related U.S. Application Data

(63) Continuation-in-part of application No. 10/880,774, filed on Jun. 28, 2004.

(51) Int. Cl.
*G09G 5/00* (2006.01)
(52) U.S. Cl. ............ 345/629; 345/619; 345/634; 345/638; 345/639; 345/419; 345/427; 345/428; 345/429
(58) Field of Classification Search ........ 345/419–429, 345/619, 629, 638–639, 634; 382/298–302
See application file for complete search history.

(56) References Cited

U.S. PATENT DOCUMENTS

| | | | |
|---|---|---|---|
| 6,266,068 B1 * | 7/2001 | Kang et al. ............ | 345/629 |
| 6,320,978 B1 * | 11/2001 | Szeliski et al. ........ | 382/154 |
| 6,348,918 B1 * | 2/2002 | Szeliski et al. ........ | 345/419 |
| 6,788,809 B1 * | 9/2004 | Grzeszczuk et al. ..... | 382/154 |
| 7,016,411 B2 * | 3/2006 | Azuma et al. ........ | 375/240.08 |
| 2002/0122113 A1 * | 9/2002 | Foote ................. | 348/48 |
| 2003/0012277 A1 * | 1/2003 | Azuma et al. ........ | 375/240.08 |

OTHER PUBLICATIONS

U.S. Appl. No. 10/880,774, filed Jun. 28, 2004, Kang et al.
U.S. Appl. No. 10/879,327, filed Jun. 28, 2004, Zitnick et al.
U.S. Appl. No. 10/879,235, filed Jun. 28, 2004, Zitnick et al.
U.S. Appl. No. 10/910,088, filed Aug. 3, 2004, Uyttendaele et al.
Buehler, C., M. Bosse, L. McMillan, S. Gortler, and M. Cohen, Unstructured lumigraph rendering, *Proceedings of SIGGRAPH 2001*, pp. 425-432.
Carceroni, R. L., and K. Kutulakos, Multi-view scene capture by surfel sampling: From video streams to non-rigid 3D motion, shape and reflectance, *Eighth International Conference on Computer Vision*, vol. II, pp. 60-67.

(Continued)

*Primary Examiner*—Ulka J. Chauhan
*Assistant Examiner*—Eric Woods
(74) *Attorney, Agent, or Firm*—Lyon & Harr, LLP; Richard T. Lyon

(57) ABSTRACT

A system and process for generating, and then rendering and displaying, an interactive viewpoint video in which a user can watch a dynamic scene while manipulating (freezing, slowing down, or reversing) time and changing the viewpoint at will. In general, the interactive viewpoint video is generated using a small number of cameras to capture multiple video streams. A multi-view 3D reconstruction and matting technique is employed to create a layered representation of the video frames that enables both efficient compression and interactive playback of the captured dynamic scene, while at the same time allowing for real-time rendering.

20 Claims, 7 Drawing Sheets

OTHER PUBLICATIONS

Carranza, J., C. Theobalt, M. Magnor, and H.-P. Seidel, Free-viewpoint video of human actors, *ACM Transactions on Graphics*, vol. 22, No. 3, pp. 569-577.

Chai, B.-B., S. Sethuraman, H. S. Sawhney, P. Hatrack, Depth map compression for real-time view-based rendering, *Pattern Recognition Letters*, 2004, vol. 25, No. 7, pp. 755-766.

Chang, C.-L., X. Zhu, P. Ramanathan, and B. Girod, Inter-view wavelet compression of light fields with disparity-compensated lifting, *SPIE Visual Communications and Image Processing*, 2003, *Invited Paper*.

Chuang, Y.-Y., B. Curless, D. Salesin, and R. Szeliski, A Bayesian approach to digital matting, *Conf. on Comp. Vision and Pattern Recognition*, 2001, vol. II, pp. 264-271.

Debevec, P.E., C. J. Taylor, and J. Malik, Modeling and rendering architecture from photographs: A hybrid geometry- and image-based approach, *Computer Graphics (SIGGRAPH '96)*, Aug. 1996, pp. 11-20.

Debevec, P.E., Y. Yu, and G. Borshukov, Efficient view-dependent image-based rendering with projective texture mapping, *Ninth Eurographics Rendering Workshop*, Vienna, Austria, Jun. 1998.

Gortler, S.J., R. Grzeszczuk, R. Szeliski, and M. F. Cohen, The lumigraph, *ACM SIGGRAPH Comp. Graphics Proceedings, Annual Conference Series*, pp. 43-54.

Grammalidis, N., M. G. Strintzis, Sprite generation and coding in multiview image sequences, *IEEE Transactions on Circuits and Sys. for Video Tech.*, Mar. 2000, vol. 10, No. 2, pp. 302-311.

Hall-Holt, O., and S. Rusinkiewicz, Stripe boundary codes for real-time structured-light range scanning of moving objects, *Eighth Int'l. Conf. on Comp. Vision*, vol. II, pp. 359-366.

Heigl, B., R. Koch, M, Pollefeys, J. Denzler, L. Van Gool, Plenoptic modeling and rendering from image sequences taken by hand-held camera, *DAGM'99*, pp. 94-101.

Kanade, T., P. W. Rander, and P. J. Narayanan, Virtualized reality: constructing virtual worlds from real scenes, *IEEE MultiMedia Magazine*, Jan.-Mar. 1997, vol. 1, No. 1, pp. 34-47.

Krishnamurthy, R., B.-B. Chai, H. Tao, S.Sethuraman, Compression and transmission of depth maps for image-based rendering, *Int'l Conf. on Image Processing*, 2001, vol. 3, pp. 828-831.

Levoy, M. and P. Hanrahan, Light field rendering, *ACM SIGGRAPH Comp. Graphics Proceedings, Annual Conference Series*, Aug. 1996, pp. 31-42.

Lim, J., K. N. Ngan, W. Yang, K. Sohn, A multiview sequence CODEC with view scalability, *Signal Processing: Image Communication*, 2004, vol. 19, pp. 239-256.

Pulli, K., M. Cohen, T. Duchamp, H. Hoppe, L. Shapiro, and W. Stuetzle, View-based rendering, *Eurographics Workshop on Rendering*, 1997, pp. 23-34.

Scharstein, D., and R. Szeliski, A taxonomy and evaluation of dense two-frame stereo correspondence algorithms, *Int'l. J. of Comp. Vision*, vol. 47, No. 1, pp. 7-42.

Seitz, S. M., and C. M. Dyer, Photorealistic scene reconstruction by voxel coloring, *CVPR '97*, Jun. 1997, pp. 1067-1073.

Shade, J., S. Gortler, L.-W. He, and R. Szeliski, Layered depth images, *Comp. Graphics (SIGGRAPH '98)* Proceedings, Jul. 1998, pp. 231-242.

Szeliski, R., Scene reconstruction from multiple cameras, *Int'l Conf. on Image Processing (ICIP-2000)*, Vancouver, Sep. 2000, vol. 1, pp. 13-16.

Tao, H., H. Sawhney, and R. Kumar, A global matching framework for stereo computation, *Eighth Int'l. Conf. on Comp. Vision*, vol. 1, pp. 532-539.

Torr. P., R. Szeliski, and P. Anandan, An integrated Bayesian approach to layer extraction from image sequences, *IEEE Trans. on Pattern Analysis and Mach. Intelligence*, 2001, vol. 23, No. 3, pp. 297-303.

Vedula, S., S. Baker, S. Seitz, and T. Kanade, Shape and motion carving in 6D, *Conf. on Comp. Vision and Pattern Recognition*, vol. II, pp. 592-598.

Wexler, Y., A. Fitzgibbon, and A. Zisserman, Bayesian estimation of layers from multiple images, *Seventh European Conf. on Comp. Vision*, vol. III, pp. 487-501.

Wilburn, B., M. Smulski, H. K. Lee and M. Horowitz, The light field video camera, *SPIE Electronic Imaging: Media Processors*, vol. 4674, pp. 29-36.

Yang, J. C., M. Everett, C. Buehler, and L. McMillan, A real-time distributed light field camera, *Thirteenth Eurographics Workshop on Rendering*, 2002, pp. 77-85.

Zhang, L., B. Curless, and S. M. Seitz, Spacetime stereo: Shape recovery for dynamic scenes, *Conf. in Comp. Vision and Pattern Recognition*, 2003, pp. 367-374.

Zhang, Y., and C. Kambhamettu, On 3D scene flow and structure estimation, *Conf. on Comp. Vision and Pattern Recognition*, 2001, vol. II, pp. 778-785.

Zhang, Z. A flexible new technique for camera calibration, *Technical Report: MSR-TR-98-71*, Microsoft Research, Redmond, WA.

Ziegler, G., H. Lensch, N. Ahmed, M. Magnor, and H.-P. Seidel, Multi-video compression in texture space, *IEEE International Conference on Image Processing (ICIP'04)*, 2004, (accepted for publication).

Ziegler, G., H. Lensch, M. Magnor, and H.-P. Seidel, Multi-video compression in texture space using 4D SPIHT, *IEEE Int'l. Workshop on Multimedia and Signal Processing, (MMSP'04)*, 2004, (accepted for publication).

\* cited by examiner

INTERACTIVE VIEWPOINT VIDEO EMPLOYING VIEWPOINTS FORMING AN ARRAY

CROSS-REFERENCE TO RELATED APPLICATION

This application is a continuation-in-part of a prior application entitled "Interactive Viewpoint Video System And Process" which was assigned Ser. No. 10/880,774 and filed Jun. 28, 2004.

BACKGROUND

1. Technical Field

The invention is related to the generation and rendering of video, and more particularly to a system and process for generating and rendering an interactive viewpoint video in which a user can watch a dynamic scene while changing the viewpoint at will.

2. Background Art

For several years now, viewers of TV commercials and feature films have been seeing the "freeze frame" effect used to create the illusion of stopping time and changing the camera viewpoint. The earliest commercials were produced by using a film-based system, which rapidly jumped between different still cameras arrayed along a rail to give the illusion of moving through a frozen slice of time. When it first appeared, the effect was fresh and looked spectacular, and soon it was being emulated in many productions, the most famous of which is probably the "bullet time" effects seen in the movie entitled "The Matrix". Unfortunately, this effect is a one-time, pre-planned affair. The viewpoint trajectory is planned ahead of time, and many man hours are expended to produce the desired interpolated views. Newer systems are based on video camera arrays, but still rely on having many cameras to avoid software view interpolation.

Thus, existing systems would not allow a user to interactively change to any desired viewpoint while watching a dynamic image-based scene. Most of the work on image-based rendering (IBR) in the past involves rendering static scenes, with two of the best-known techniques being Light Field Rendering [12] and the Lumigraph [8]. Their success in high quality rendering stems from the use of a large number of sampled images and has inspired a large body of work in the field. One exciting potential extension of this groundbreaking work involves interactively controlling viewpoint while watching a video. The ability of a user to interactively control the viewpoint of a video enhances the viewing experience considerably, enabling such diverse applications as new viewpoint instant replays, changing the point of view in dramas, and creating "freeze frame" visual effects at will.

However, extending IBR to dynamic scenes is not trivial because of the difficulty (and cost) of synchronizing so many cameras as well as acquiring and storing the images. Not only are there significant hurdles to overcome in capturing, representing, and rendering dynamic scenes from multiple points of view, but being able to do this interactively provides a significant further complication. To date attempts to realize this goal have not been very satisfactory.

In regard to the video-based rendering aspects of an interactive viewpoint video system, one of the earliest attempts at capturing and rendering dynamic scenes was Kanade et al.'s Virtualized Reality system [11], which involved 51 cameras arranged around a 5-meter geodesic dome. The resolution of each camera is 512×512 and the capture rate is 30 fps. They extract a global surface representation at each time frame, using a form of voxel coloring [15] based on the scene flow equation [18]. Unfortunately, the results look unrealistic because of low resolution, matching errors, and improper handling of object boundaries.

Carranza et al. [3] used seven synchronized cameras distributed around a room looking towards its center to capture 3D human motion. Each camera is at CIF resolution (320×240) and captures at 15 fps. They use a 3D human model as a prior to compute 3D shape at each time frame.

Yang et al. [21] designed an 8×8 grid of cameras (each 320×240) for capturing a dynamic scene. Instead of storing and rendering the data, they transmit only the rays necessary to compose the desired virtual view. In their system, the cameras are not genlocked; instead, they rely on internal clocks across six PCs. The camera capture rate is 15 fps, and the interactive viewing rate is 18 fps.

As a proof of concept for storing dynamic light fields, Wilburn et al. [20] demonstrated that it is possible to synchronize six cameras (640×480 at 30 fps), and compress and store all the image data in real time. They have since hooked up 128 cameras.

A lot of images are required for realistic rendering if the scene geometry is either unknown or known to only a rough approximation. If geometry is known accurately, it is possible to reduce the requirement for images substantially [8]. One practical way of extracting the scene geometry is through stereo, and a lot of stereo algorithms have been proposed for static scenes [14]. However, there have been a few attempts at employing stereo techniques with dynamic scenes. As part of the Virtualized Reality work [11], Vedula et al. [18] proposed an algorithm for extracting 3D motion (i.e., correspondence between scene shape across time) using 2D optical flow and 3D scene shape. In their approach, they use a voting scheme similar to voxel coloring [15], where the measure used is how well a hypothesized voxel location fits the 3D flow equation.

Zhang and Kambhamettu [22] also integrated 3D scene flow and structure in their framework. Their 3D affine motion model is used locally, with spatial regularization, and discontinuities are preserved using color segmentation. Tao et al. [17] assume the scene is piecewise planar. They also assume constant velocity for each planar patch in order to constrain the dynamic depth map estimation.

In a more ambitious effort, Carceroni and Kutulakos [2] recover piecewise continuous geometry and reflectance (Phong model) under non-rigid motion with known lighting positions. They discretize the space into surface elements ("surfels"), and perform a search over location, orientation, and reflectance parameter to maximize agreement with the observed images.

In an interesting twist to the conventional local window-matching, Zhang et al. [23] use matching windows that straddle space and time. The advantage of this method is that there is less dependence on brightness constancy over time.

Active rangefinding techniques have also been applied to moving scenes. Hall-Holt and Rusinkiewicz [9] use projected boundary-coded stripe patterns that vary over time. There is also a commercial system on the market called ZCam™ manufactured by 3DV Systems of Israel, which is a range sensing video camera add-on used in conjunction with a broadcast video camera. However, it is an expensive system, and provides single viewpoint depth only, which makes it less suitable for multiple view-point video.

However, despite all the advances in stereo and image-based rendering, it is still very difficult to interactively render high-quality, high resolution views of dynamic scenes. The present invention tackles this problem in a cost efficient manner.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for first generating, and then rendering and displaying an interactive viewpoint video in which a user can watch a dynamic scene while manipulating (freezing, slowing down, or reversing) time and changing the viewpoint at will. Since different trajectories can be taken through space-time, no two viewing experiences need be the same. In general, this is accomplished with a system and process that uses a small number of cameras to capture multiple high-quality video streams of a scene. Not only does this reduce the cost associated with capturing the video streams needed to render the scene from a variety of viewpoints over existing methods, but is also advantageous as it makes the capture system portable. A multi-view 3D reconstruction and matting technique is next employed to create a layered representation from the video frames that enables both efficient compression and interactive playback of the captured dynamic scene, while at the same time allowing real-time rendering.

More particularly, the interactive viewpoint video generating system has a video capture sub-system that includes a bank of video cameras for capturing multiple video streams and synchronization equipment for synchronizing the video streams. Collectively, the video streams can be characterized as being sequential groups of contemporaneously captured video frames each depicting a different viewpoint of a scene. The capture sub-system can also include storage equipment for storing the video streams prior to processing.

The video cameras are arranged in a rectangular or triangular array with regular or irregular camera placement, such that each camera views the scene from a different viewpoint. The field of view of each camera overlaps the field of view of any adjacent camera by a prescribed amount. This camera array arrangement results in the user being able to view the scene from any vantage point on a surface formed by the camera viewpoints, even if it does not coincide with one of the camera positions. Thus, it would appear to users as if they can pan and tilt across the scene, bounded only by the edges of the array.

The video cameras can be high resolution cameras as this will improve the quality of the interactive viewpoint video that is generated. In addition, the cameras can have a genlock feature to facilitate synchronizing the video streams. Further, it would be advantageous for ease in processing the video streams if the cameras are capable of adding metadata to each video frame generated. This metadata would include, for example, the current settings and exposure level of the camera, and a timestamp.

In addition to the cameras and synchronization equipment, the capture sub-system includes a computing device, which runs a camera calibration program for computing geometric and photometric parameters associated with each video stream. Further, the video cameras can be of the type that are controllable by a computer. If so, the aforementioned computing device can also be used to run a video capture program that simultaneously turns the cameras on or off, and adjusts their settings, based on a pre-established menu or in response to user inputs.

The interactive viewpoint video generating system also employs the aforementioned computing device or a different computing device to run a video generating program. In general, this generating program is used to first produce a 3D reconstruction of the scene depicted in each group of contemporaneous frames from the synchronized video streams. In tested embodiments of the generating program, a segmentation-based reconstruction technique was employed for this purpose. For each group of contemporaneous frames, the resulting reconstruction is used to compute a disparity map for each frame in the group. The reconstruction can also be used to compute correspondences across all the camera views in the group frames. These correspondences can then be used for, among other things, balancing the photometric parameters between the frames in the group. Further, for each frame in the group under consideration, areas of significant depth discontinuities are identified based on its disparity map. Within these areas, foreground and background information is computed. Using this information, a separate main layer and boundary layer is established for each frame. The main layer is made up of pixels having disparity values that do not exhibit depth discontinuities exceeding a prescribed threshold and the background information from the areas surrounding depth discontinuities. The boundary layer is made up of the foreground information in areas close to or having depth discontinuities that exceed the threshold. Thus, a layered representation of each frame is produced. The main layer is characterized by a color and depth of each pixel in the layer. However, the boundary layer is characterized by not only a color and depth of each pixel, but also an opacity value for each pixel in the layer. It is noted that in tested embodiments of the video generation program, the boundary layer was dilated to encompass a prescribed number of pixels adjoining the pixels exhibiting depth discontinuities that exceed the threshold. This was done to prevent "cracks" from appearing during the rendering procedure that will be described shortly.

The interactive viewpoint video generation program can further include a provision for compressing the aforementioned layered representations to facilitate transfer and/or storage of the video. This compression can employ temporal or spatial compression techniques, or as in tested embodiments a combined temporal and spatial compression approach. Still further, the generation program can have a file generation program module for creating a file that includes the layered representations of the interactive viewpoint video frames and the previously computed calibration data.

It is noted that the video generation program can also be employed to create an interactive viewpoint video from computer generated video streams, rather than frames captured by actual video cameras. In this case, the calibration data would be provided directly by the generating program.

The aforementioned rendering and displaying system that is used to play the interactive viewpoint video has a user interface sub-system for inputting user viewpoint selections and displaying rendered interactive viewpoint video frames to the user. To this end, the system includes an input device of some type that is employed by the user to input viewpoint selections on an ongoing basis, and a display device used to display the rendered interactive viewpoint video frames to the user. In addition, the user interface sub-system can include a graphic user interface that allows the user to graphically indicate the viewpoint via the input device.

The rendering and displaying system further includes a computing device on which a rendering program is run. This rendering program is used to render each frame of the interactive viewpoint video. In general, for each frame rendered, this includes first identifying the current user-specified viewpoint. The frame or frames that are needed, from the group of contemporaneous frames associated with the current temporal portion of the video being played, in order to render the current frame of the interactive viewpoint video from the identified viewpoint, are then identified. This generally entails using the calibration data to determine the viewpoints associated with each frame in the current group, and then determining if the current user-selected viewpoint coincides with one of the frame viewpoints or falls between the frame viewpoints. When the identified viewpoint coincides with a viewpoint of one of the video frames, that frame is identified as the frame needed to render the scene. However, when the identified viewpoint falls between the viewpoints of the video frames, these frames are identified as the frames needed to render the scene.

Once the required frame or frames are identified, the layered representations corresponding to these frames are obtained. This at a minimum entails extracting just the needed frame data from the interactive viewpoint video data. If the video data is contained in a file, as described above, it will typically need to be decoded. A selective decoding module of the rendering program can be employed for this purpose. Further, if the layered frame data has been compressed, the decoder module is responsible for decompressing the portion of the video data needed to recover the particular frames required to render the scene from the desired viewpoint.

The decoded frame data is used to render the next frame of the interactive viewpoint video from the viewpoint currently specified by the user. This is a straightforward process if the specified viewpoint coincides with the viewpoint associated with a decoded frame. However, if the desired viewpoint falls between frames, the rendering process is more involved. In one embodiment of the rendering process, this entails, for each of the input frames in turn, first projecting the main layer of the input frame under consideration into a virtual view corresponding to the current user-specified viewpoint, and then also projecting the boundary layer of the input frame under consideration into the virtual view. The projected boundary layers and projected main layers are blended to create a finalized frame of the interactive viewpoint video. It is noted that the blending of the projected layers involves weighting each layer in direct proportion to how close the viewpoint associated with that layer is to the current user-specified viewpoint.

It is noted that the rendering process can further include inserting an object not found in the inputted layered frame representations into the frame being rendered. These objects can be computer generated or imaged-based.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

Figure 1:
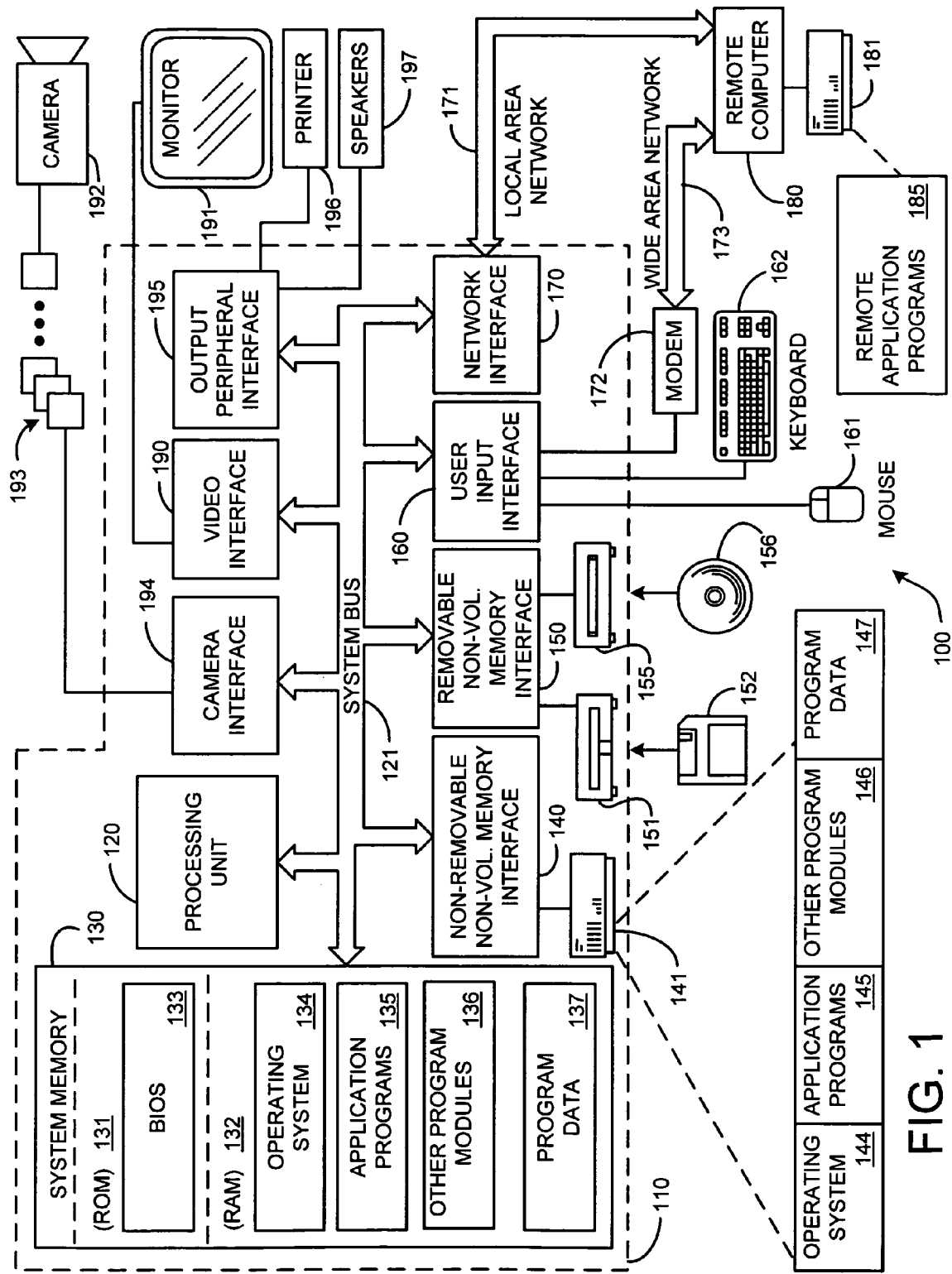
FIG. 1 is a diagram depicting a general purpose computing device constituting an exemplary system for implementing the present invention.

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Interactive Viewpoint Video

The ability to interactively control viewpoint while watching a video is an exciting new application for image-based rendering. The present system and process provides this capability by rendering dynamic scenes with interactive viewpoint control using multiple synchronized video streams combined with novel image-based modeling and rendering techniques. Because any intermediate view can be synthesized at any time, with the potential for space-time manipulation, the present approach has been dubbed interactive viewpoint video.

A key advantage of the present interactive viewpoint video system and process is that view-interpolated frames of the highest possible quality are provided to enhance the viewing experience, even though relatively few cameras are used to capture the viewed scene. This is not easily achieved. One approach, as suggested in the Light Field Rendering paper [12], is to simply resample rays based only on the relative positions of the input and virtual cameras. As demonstrated in the Lumigraph [8] and subsequent work, however, using a 3D impostor or proxy for the scene geometry can greatly improve the quality of the interpolated views. Another approach is to create a single texture-mapped 3D model [11], but this generally produces inferior results to using multiple reference views.

The present system and process employs the geometry-assisted image-based rendering approach, which requires a 3D proxy. One possibility is to use a single global polyhedral model, as in the Lumigraph and Unstructured Lumigraph papers [1]. Another possibility is to use per-pixel depth, as in Layered Depth Images [16], offset depth maps in Facade [6], or sprites with depth [16]. In general, using different local geometric proxies for each reference view [13, 7, 10] produces higher quality results, so that approach is adopted.

To obtain the highest possible quality for a fixed number of input images, per-pixel depth maps are used. These depth maps are generated by the novel 3D reconstruction technique to be described shortly. However, even multiple depth maps still exhibit rendering artifacts when generating novel views, i.e., aliasing (jaggies) due to the abrupt nature of the foreground to background transition and contaminated colors due to mixed pixels, which become visible when compositing over novel backgrounds or objects.

These problems are addressed using a unique two-layer representation. This representation is generated by first locating the depth discontinuities in a depth map $d_j$, and in one embodiment of the invention, creating a boundary strip around the pixels. A variant of Bayesian matting [5] is then used to estimate the boundary and main layer colors, depths, and opacities (alpha values). To reduce the data size, the multiple alpha-matted depth images can be compressed as will also be described shortly.

At rendering time, the three or four reference views nearest the virtual view are chosen. Each view is rendered independently by warping each of its two layers using the associated depth map and compositing the boundary layer over the main layer. The two warped views are then blended based on their proximity to the novel view. Alternately, the main layers and boundary layers from each view can be independently rendered, and then blended together. A more detailed description of this process will also be given later.

The following sections will present details of the present interactive viewpoint video system and process. A computing environment suitable for implementing the programmatic portions of the present system is presented first. This is followed by a description of the interactive viewpoint video capture sub-system used to capture and synchronize multiple videos. Then descriptions of the interactive viewpoint video system programs are presented.

1.1 The Computing Environment

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the interactive viewpoint video system hardware, program module architecture and the modules themselves.

1.2 Interactive Viewpoint Video Capture System

In general the interactive viewpoint video capture system includes the hardware and supporting software needed to capture the aforementioned multiple video streams. The capture system hardware includes a bank of video cameras, arranged in an array. In addition, the cameras have a convergent configuration such that each points generally toward the same target object or area in a scene with each camera's field of view overlapping the field of view of the adjacent camera or cameras by a prescribed amount (e.g., 30 degrees horizontal field of view per camera with relative rotation of 4-8 degrees between two adjacent cameras). The orientation of the cameras in relation to the target object or area can vary depending on the desired results. In other words, the distance each camera is away from the target object or area can vary. Thus, the array of cameras need not be planar.

Figures 2A, 2B:
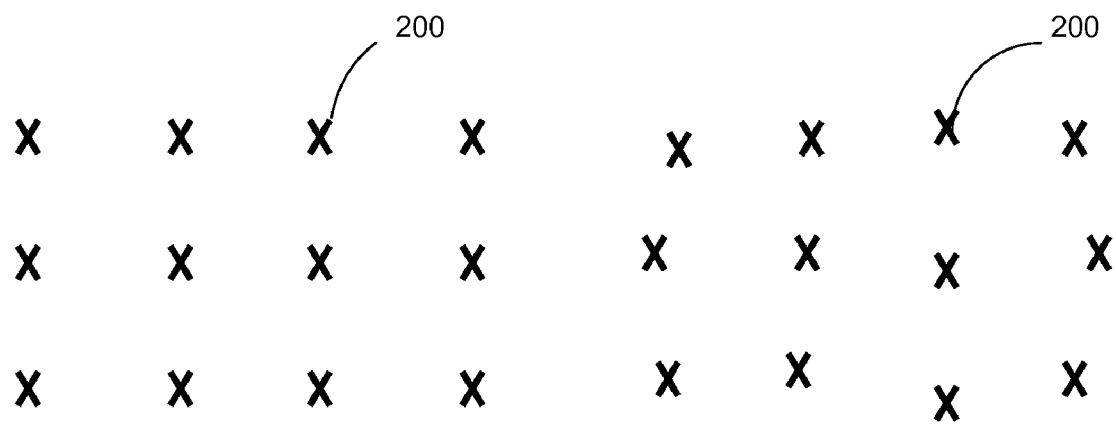
FIGS. 2(a)-(d) are diagrams showing a regular rectangular array in FIG. 2(a), an irregular rectangular array in FIG. 2(b), a regular triangular array in FIG. 2(c) and an irregular triangular array in FIG. 2(d).
Figures 2C, 2D:
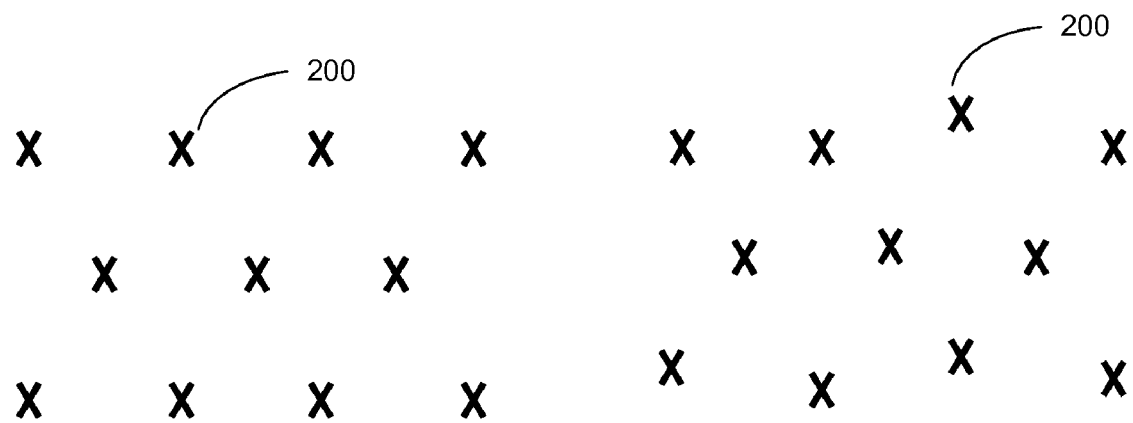

Further, the array of cameras can be rectangular or triangular, and the placement pattern can be regular or irregular. For example, FIG. 2(a) illustrates a rectangular configuration with a regular placement pattern. In other words, when looking toward the center of the array, the camera viewpoints 200 indicated by the X's appear to be lined up in straight columns and rows. FIG. 2(b) exemplifies a rectangular configuration with an irregular placement pattern. In this case, when looking toward the center of the array, the viewpoints 200 are generally in columns and rows, but each viewpoint may be skewed so that they do not line up perfectly. FIG. 2(c) illustrates a triangular configuration with a regular placement pattern. Here, when looking toward the center of the array, the viewpoints 200 appear to be lined up in horizontal rows, but diagonal columns. FIG. 2(d) exemplifies a triangular configuration with an irregular placement pattern. In this case, when looking toward the center of the array, the viewpoints 200 are generally in the aforementioned horizontal row and diagonal column pattern, but each may be skewed so that they do not line up perfectly. It is noted that the number of cameras shown in the figures is arbitrary, and there can be more or less as desired.

This foregoing camera array arrangement results in the user being able to view the scene from any vantage point along a surface connecting the camera viewpoints. Thus, it would appear to users as if they can pan and tilt across the scene, bounded only by the edges of the array.

The cameras can be any appropriate video camera, however a digital video camera is preferred. If a digital camera is not employed, each video frame will have to be digitized prior to performing the further processing that will be described in subsequent sections. In addition, while the video cameras need not be high resolution cameras, the quality of the resulting interactive viewpoint video is enhanced if such cameras are employed. Still further, to assist in synchronizing the video streams, it is advantageous if the cameras are of the type that can be remotely controlled via a computer to start and stop and to adjust the camera settings. Thus, a user can control all the cameras simultaneously via the computer. Further, cameras with genlock capability would be desirable to facilitate the synchronization of their video feeds. It is also advantageous for future processing if each camera adds metadata to each video frame generated indicating the current camera settings and exposure, as well as a timestamp.

Another key feature of the present video capture system is the real-time acquisition of synchronized video streams from the cameras. To accomplish this task equipment capable of receiving and synchronizing the individual feeds from the cameras is advantageous, as is equipment for storing the synchronized video stream data. For example, real-time synchronization and storage of all the input videos can be handled by a series of concentrator units and a bank of hard drives. Each concentrator synchronizes the feed from a prescribed number of cameras (e.g., 4) and pipes the uncompressed video streams into the bank of hard drives through a fiber optic cable. The concentrators are synchronized (e.g., via a FireWire cable) to ensure all the video feeds are synchronous. In an alternative realization of the system, each camera could have its own recording device such as DV tape, VHS tape, etc. The video may then be transferred to hard disk after recording.

The aforementioned computer runs a video capture program designed to control the multiple cameras. In essence, the video capture program can be any conventional program that is capable of simultaneously turning on and off multiple video cameras, as well as adjusting the camera settings (e.g., exposure, white balance, focus, among others) of each of the cameras. In practice, appropriate camera setting would be determined using standard methods prior a capture session, and the video capture program would be used to adjust all the cameras to these settings. The capture program also simultaneously starts all the cameras at a pre-established time or upon the input of a user command to do so. Likewise, the capture program simultaneously stops all the cameras at a pre-established time or upon the input of a user command.

In addition to the capture and storing of video streams, the interactive viewpoint video capture system also includes camera calibration program, which can be run on the same computer used to control the cameras or a different computer. The cameras are calibrated before every capture session to obtain all the camera attributes necessary for 3D reconstruction. These attributes including both geometric parameters (e.g., intrinsic and extrinsic camera parameters) and photometric parameters (e.g., exposure, white balance, vignetting). In tested embodiments, the geometric camera parameters were obtained using the calibration technique of Zhang [24]. This procedure generally involves moving a calibration pattern which has been mounted on a flat surface in front of each camera. The video stream generated by each camera depicting the calibration pattern is then analyzed to recover the aforementioned camera attributes. The camera parameters are stored and provided, along with the video streams, to the interactive viewpoint video generation program that will be described shortly.

1.3 Interactive Viewpoint Video System Programs

The interactive viewpoint video system also includes computer programs for both generating the interactive viewpoint video and rendering it for playback to a user. The architecture and program modules making up each of these programs will now be described.

1.3.1 Interactive Viewpoint Video Generation Program Architecture

Figure 3:
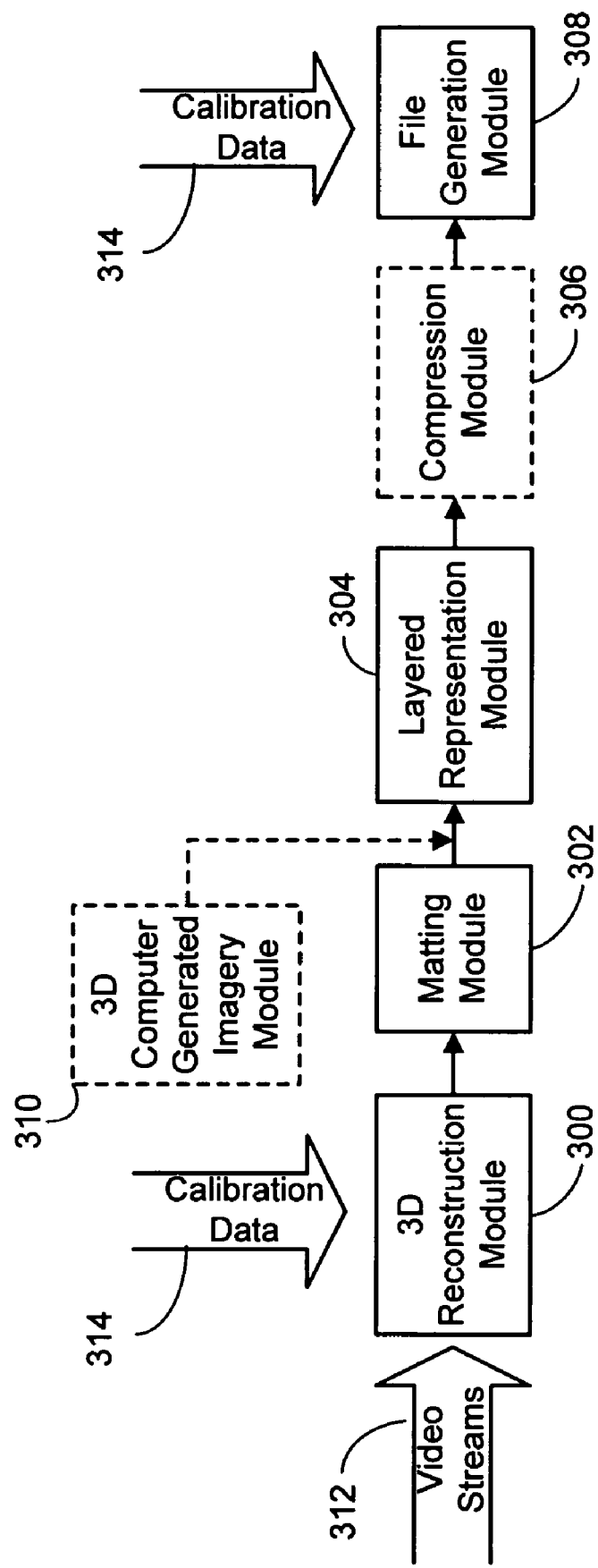
FIG. 3 is a block diagram showing the general computer program module architecture for one embodiment of the interactive viewpoint video generation program according to the present invention.

FIG. 3 shows the general computer program module architecture for generating the interactive viewpoint video. As discussed heretofore, video streams 312 can either be generated from video frames captured by the aforementioned video capture system, or alternatively the video streams can be computer generated. In the case where the video streams 312 are generated from video frames captured by the video capture system, if the cameras used in the video capture system are capable of adding metadata to the video frames they generate, they would do so since it is advantageous for future processing. The metadata added by each camera would include its calibration data. In this case, the camera calibration data would be contained within the video streams 312, which are first fed to a 3D reconstruction module 300 for processing. The purpose of the 3D reconstruction module 300 is to generate high-quality photo-consistent correspondences across all camera views, and disparity maps, for each frame in each group of contemporaneously captured video frames. In addition, the reconstruction module 300 can balance the photometric parameters of each group of frames once the correspondences are known.

Each disparity map generated is processed by the matting module 302. Generally, the matting module 302 is responsible for identifying areas of significant depth discontinuities in a frame based on its disparity map. This information is then provided to the layered representation module 304, which in one embodiment of the present system, generates a main layer made up of pixels associated with areas in a frame that do not exhibit significant depth discontinuities and background information is areas around depth discontinuities, and a boundary layer made up of foreground information from pixels associated with areas having significant depth discontinuities. Thus, a two-layer representation is created for each frame of the video streams from each of the cameras.

The two-layer video frame representations are next optionally provided to a compression module 306. While compression of the data is optional, it is noted that the two layers for each frame generated by each camera in the aforementioned bank of cameras will represent a significant amount of data (e.g., on the order of 800 MB uncompressed for 8 cameras at 15 fps recording for 1 sec). Thus, any compression of the data will assist in its transmittal and/or storage. The optional nature of this module is indicated in FIG. 3 by the use of a dashed line box.

The two-layer video frame representations, whether compressed or not, are next passed to a file generation module 308. Additionally, the previously obtained camera calibration data 314 is provided to the file generation module 308. In essence, the file generation module 308 encodes the two-layer video frame representations and calibration data for direct transmission to the aforementioned interactive viewpoint video rendering program for processing, or to storage for future transmission to the rendering program. In one embodiment of the present invention the camera calibration data 314 is placed in the video file header.

Referring again to FIG. 3, in the case where the video streams 312 are computer generated, then the calibration data would not be contained within the video streams, but rather, calibration data 314 would be separately provided to the 3D reconstruction module 300 and file generation module 308 by the computers that generated the video streams.

It is noted that while the preferred mode of operation of the foregoing interactive viewpoint video generation program is to employ image-based representations of a captured scene, it is still possible to implement the present system and process using 3D computer generated imagery instead. In this alternate embodiment, the 3D reconstruction module is eliminated and instead computer generated video frames are input into the matting module 302 via a 3D computer generated imagery module 310. Thus, the previously-described capturing system is also not needed. Here again the optional nature of the imagery module 310 is indicated in FIG. 3 by the use of a dashed line box.

The synthetic frames input in lieu of the camera-captured frames would still exhibit all the same attributes described previously in connection with the description of the real video streams. In addition, virtual camera parameter information would be input into the file generation module for each synthesized video stream in lieu of actual camera calibration data. The synthesized frame and camera parameter data would then be processed in the same way as the image-based data. As such, for the purposes of the remaining description of the invention, no distinction will be made as to whether the frame data provided to the layered representation module is image-based or synthesized. Likewise, no distinction will be made as to whether the cameras are real or virtual, and whether the camera parameters were computed or synthesized.

1.3.1.1 3D Reconstruction Module

When developing a stereo vision process for use in view interpolation, the requirements for accuracy vary from those of standard stereo algorithms used for 3D reconstruction. Specifically, errors in disparity are not as much of a concern as errors in intensity values for the interpolated image. For example, a multi-pixel disparity error in an area of low texture, such as a white wall, will result in significantly less intensity error in the interpolated image than the same disparity error in a highly textured area. In particular, edges or straight lines in the scene need to be rendered correctly.

Traditional stereo algorithms tend to produce erroneous results around disparity discontinuities. Unfortunately, such errors produce some of the most noticeable artifacts in interpolated scenes, since disparity discontinuities typically coincide with intensity edges. For this reason, the stereo algorithm for view interpolation must correctly match pixels around intensity edges including disparity discontinuities.

Recently, a new approach to stereo vision called segmentation-based stereo has been proposed. These methods segment the image into regions likely to have similar or smooth disparities prior to the stereo computation. A smoothness constraint is then enforced for each segment. Tao et al. [17] used a planar constraint, while Zhang and Kambhamettu [22] used the segments for local support. These methods have shown very promising results in accurately handling disparity discontinuities.

While the foregoing segmentation-based stereo techniques can be employed to accomplish the 3D reconstruction task, tested embodiments of the present invention employed a new segmentation-based approach. This new approach is the subject of a co-pending application entitled "Color Segmentation-Based Stereo 3D Reconstruction System And Process Employing Overlapping Images Of A Scene Captured From Viewpoints Forming Either A Line Or A Grid" by the inventors of this application and assigned to the common assignee. The co-pending application was filed on Mar. 31, 2005 and assigned Ser. No. 11/097,529.

1.3.1.2 Matting Module

During stereo computation, it is assumed that each pixel had a unique disparity. In general this is not the case, as some pixels along the boundary of objects will receive contributions from both the background and foreground regions. However, if the original mixed pixel colors are used during image-based rendering, visible artifacts will result.

To solve this problem, small areas are identified in the vicinity of depth discontinuities, which are defined as any disparity jump greater than $\lambda$ pixels (e.g., 4 pixels). More particularly, matting is used to find foreground and background information for each pixel within these areas. The foreground information is stored within the boundary layer, while the background information and the information from pixels not within $\lambda$ pixels of a depth discontinuity are stored in the main layer. To prevent cracks from appearing during the rendering procedure to be described later, the boundary matte is dilated (e.g., by one pixel toward the inside of the foreground pixel region). This pixel label information is then passed on the layered representation module.

While the foregoing matting task can be accomplished using any appropriate conventional matting technique, tested embodiments of the present invention employed a new approach. This new approach is the subject of a co-pending application entitled "A System And Process For Generating A Two-Layer, 3D Representation Of A Scene" by the inventors of this application and assigned to the common assignee. The co-pending application was filed on Jun. 28, 2004 and assigned Ser. No. 10/879,235.

1.3.1.3 Layered Representation Module

The layered representation module takes the data associated with each frame, as well as the pixel label information generated by the matting module and estimates the colors, depths, and opacities (i.e., alpha values) for the boundary matte. This can be accomplished using a matting technique, such as, for example, Bayesian image matting [5]. Note that [5] does not estimate depths, only colors and opacities. Depths can be estimated by using alpha-weighted averages of nearby depths in the foreground and background pixel regions. The resulting foreground pixel data is designated as the boundary layer for the frame being processed. Next, the background pixel data along with the pixel data from the remaining pixels not within the boundary matte are used to make up the main layer of the frame.

Accordingly, the output of the layered representation module is a boundary layer for each frame of the video stream from each of the aforementioned cameras, which identifies for each pixel in the layer, the pixel's color $B_C$, depth $B_D$ and opacity $\alpha$. In addition, a main layer is output for each frame, which identifies for each pixel in that layer, the pixel's color $M_C$, depth $M_D$ While the foregoing layering task can be accomplished using any appropriate conventional layering technique, tested embodiments of the present invention employed a new approach. This new approach is the subject of the aforementioned co-pending application entitled "A System And Process For Generating A Two-Layer, 3D Representation Of A Scene", which was filed on Jun. 28, 2004 and assigned Ser. No. 10/879,235.

1.3.1.4 Compression Module

Compression can optionally be used to reduce the large data-sets associated with the present invention to a manageable size and to support faster playback. Any conventional temporal-based compression scheme, for example MPEG-4 (ISO/IEC 14496), can be adopted with advantage in the present invention. However, because each camera is capturing part of the same scene, an opportunity exists to compress the data by exploiting the between-camera (i.e., spatial) redundancies. Temporal prediction uses motion compensated estimates from the preceding frame, while spatial prediction uses a reference camera's texture and disparity maps transformed into the viewpoint of a spatially adjacent camera as a basis for compression. For example MPEG-4 contains a standard for compression of stereoscopic data that exploits the similarity of adjacent viewpoints. Thus, in general a codec that exploits temporal or spatial redundancy is appropriate for this task. However, maximum compression can be achieved by combining the two compression methods.

While the foregoing combined compression scheme can be implemented using existing temporal and spatial compression techniques, tested embodiments of the present invention employed a new integrated approach. This new approach is the subject of a co-pending application entitled "A System And Process For Compressing And Decompressing Multiple, Layered, Video Streams Of A Scene Captured From Different Viewpoints Forming A Grid Using Spatial And Temporal Encoding" by the inventors of this application and assigned to the common assignee. The co-pending application was filed on Mar. 31, 2005 and assigned Ser. No. 11/097,533.

1.3.2 Interactive Viewpoint Video Generation Process

Figure 4A:
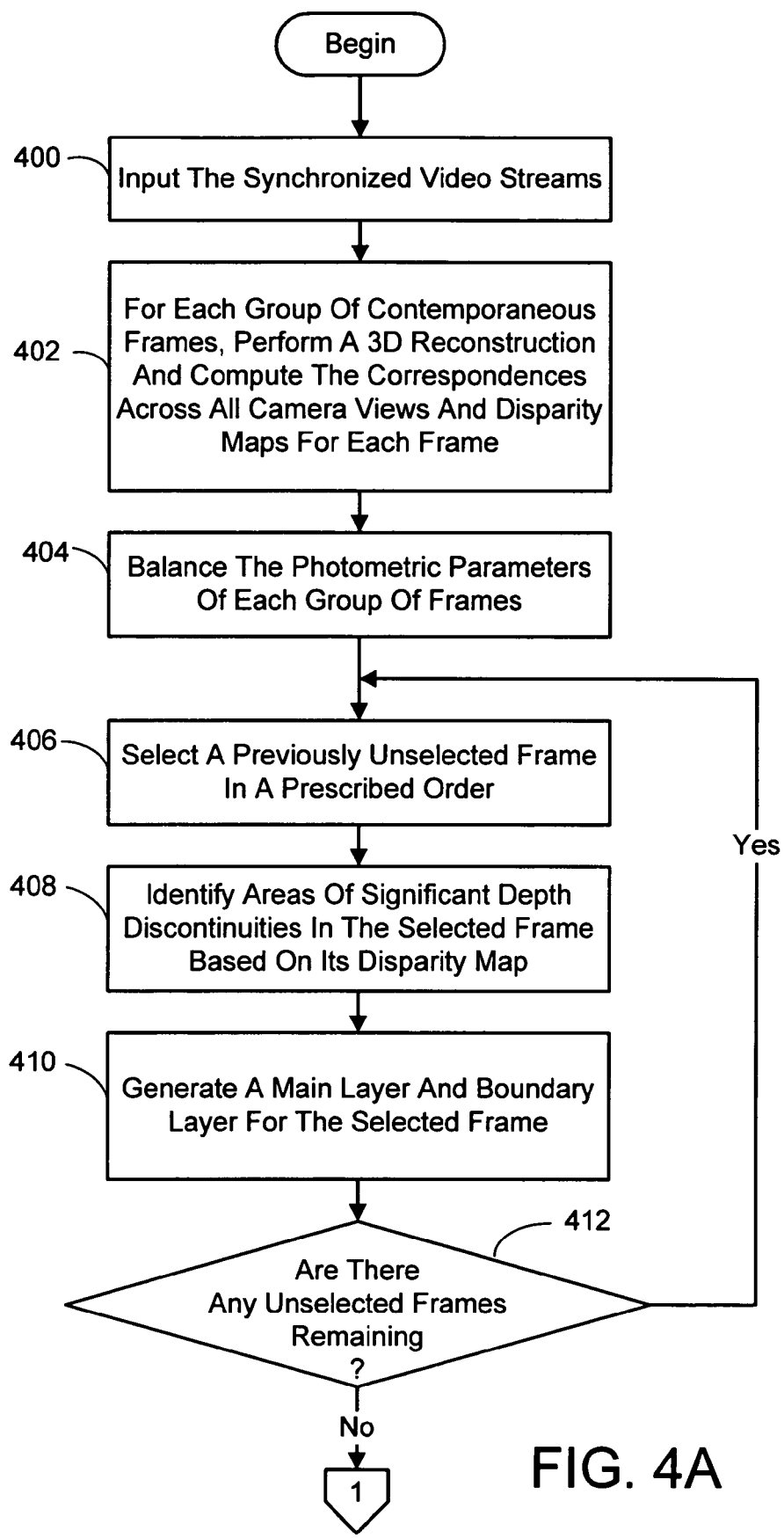
FIGS. 4A and 4B are a flow chart diagramming one embodiment of the interactive viewpoint video generation process according to the present invention.
Figure 4B:
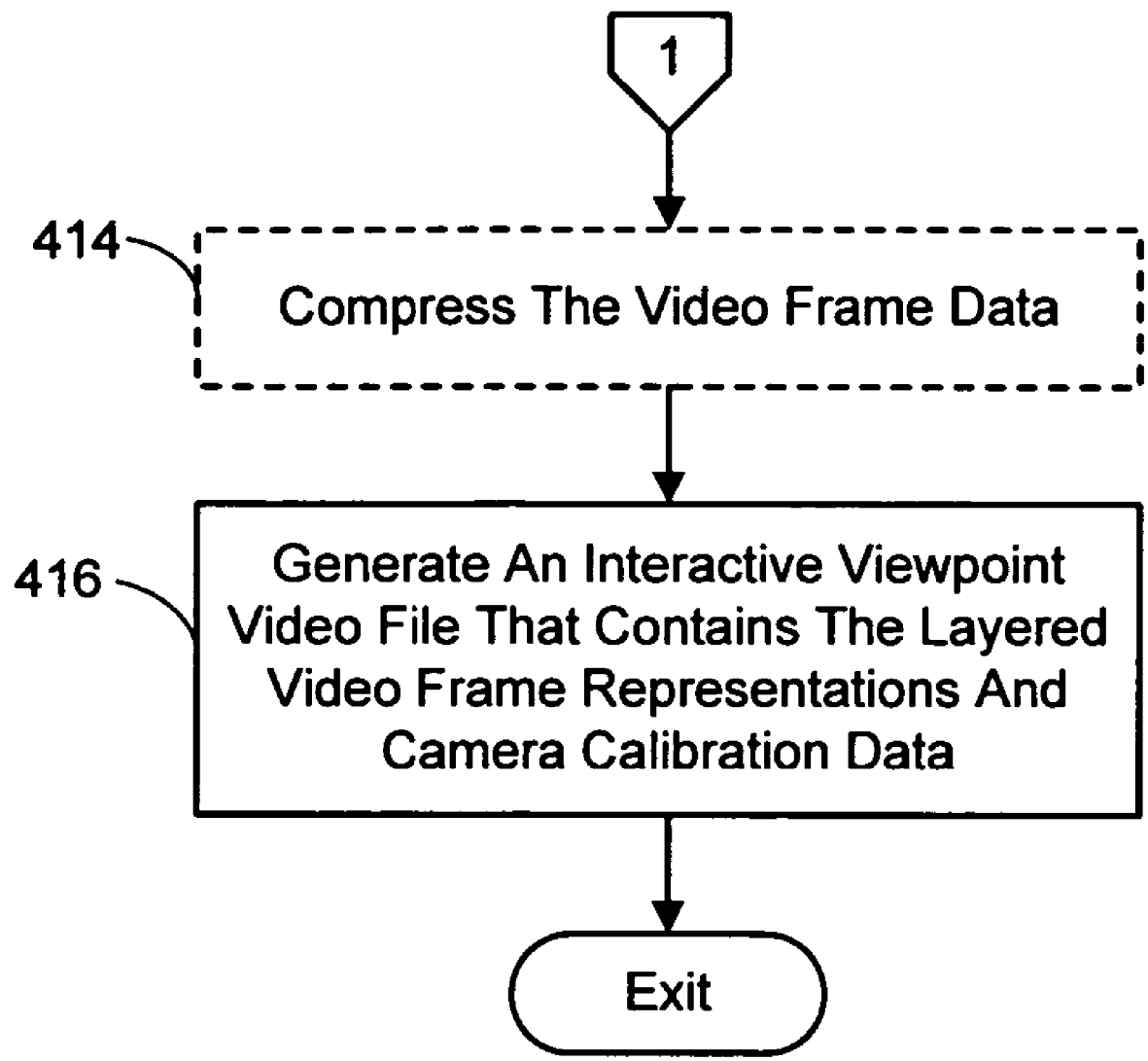

The foregoing program architecture can be employed to perform the following process to generate an interactive viewpoint video in one embodiment of the present invention as shown in FIGS. 4A-B. First, the synchronized video streams are input from the previously described video capture system (process action 400). A 3D reconstruction is then performed to compute the correspondences across all camera views, and disparity maps for each frame in each group of contemporaneously captured video frames from the input video streams (process action 402). In addition, the photometric parameters of each group of frames are balanced once the correspondences are known (process action 404).

Next, each frame is selected in a prescribed order (process action 406). More specifically, this entails selecting each frame in each incoming group of contemporaneously captured video frames (in any order desired), and then doing the same for the next group of frames input and so on. For each selected frame, areas of significant depth discontinuities are identified based on its disparity map (process action 408). This information is used to generate a boundary layer made up of foreground information from pixels associated with areas having significant depth discontinuities and a main layer consisting of the remaining information (process action 410). It is then determined if there are any previously unselected frames left to process (process action 412). If so, process actions 406 through 412 are repeated until all the frames have been processed. Thus, a two-layer representation is ultimately created for each frame. If there are no frames left to select, then the generation process continues with optionally compressing the video frame data (process action 414). This can be done using, for example, both temporal (i.e., between groups of contemporaneously captured frames) and spatial (i.e., between the frames in the same group) compression techniques. It is noted that the optional nature of this last action is indicated in FIG. 4 by using a dashed line box. Whether the frame data is compressed or not, the next process action 416 is to generate an interactive viewpoint video file that contains the layered video frame representations and the camera calibration data provided from the video capture system.

It is noted that the image-based video streams input from the video capture system can be replaced in the foregoing interactive viewpoint video generation process with computer generated video data as described previously. In such a case, the camera calibration data would also be replaced with virtual data of the same type.

1.3.3 Interactive Viewpoint Video Rendering Program Architecture

Figure 5:
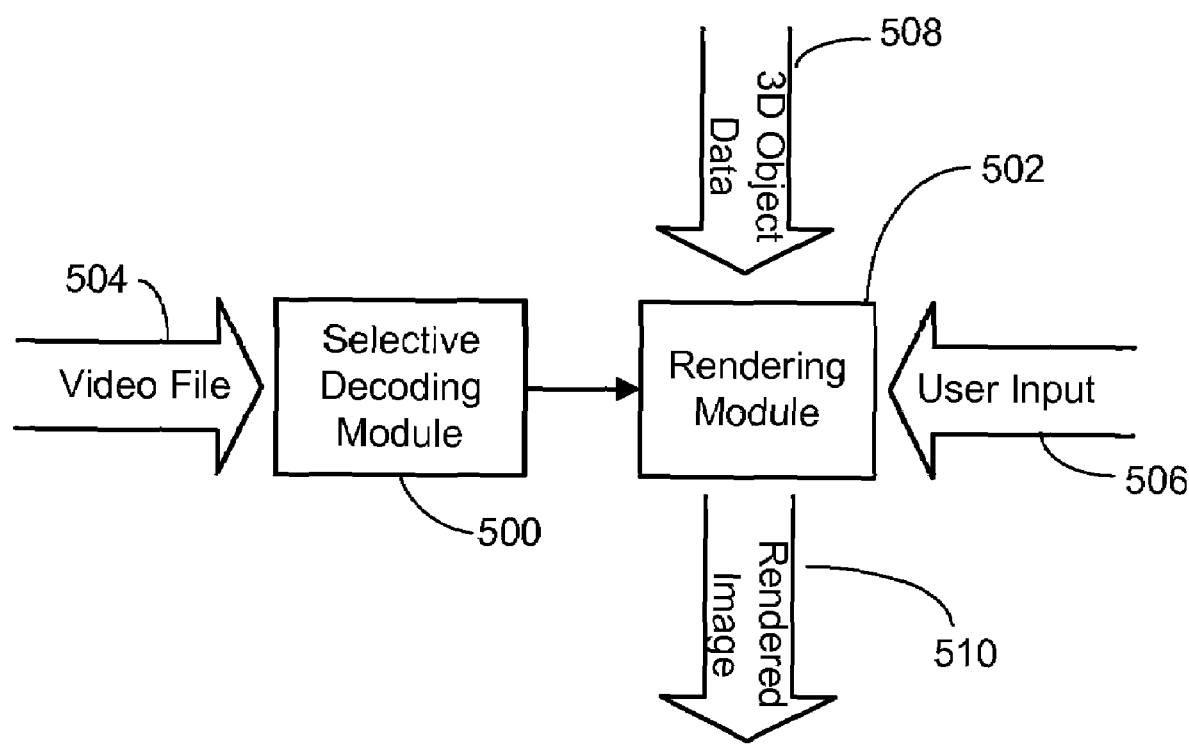
FIG. 5 is a block diagram showing the general computer program module architecture for one embodiment of the interactive viewpoint video rendering program according to the present invention.

Referring to FIG. 5, an interactive viewpoint video file 504 generated by the aforementioned file generation module is first fed into a selective decoding module 500. Generally, the selective decoding module 500 decodes just those portions of the incoming file that are needed to render a current frame of the video from a vantage point selected by a user viewing the video. More particularly, the module 500 decodes the portions of the file identified by the rendering module 502 (which will be described shortly) to recover the layered video frame data associated with the particular video frames needed to render the scene from the desired viewpoint. In this way, the minimum amount of data possible must be decoded, thereby speeding up the process and providing real-time rendering capability.

The decoded layered frame data is provided to the rendering module 502. Generally, this module 502 takes the frame data and renders a view of the scene for the current portion of the video being viewed by the user from a vantage point specified by the user. This involves first obtaining the current user input 506 and then generating the desired view in the form of a rendered image 510.

1.3.3.1 Selective Decoding Module

The purpose of the selective decoding module is to decode only the information needed to render the scene captured in the video from the current user-selected vantage point. In essence this entails decoding the frame or frames from the group of contemporaneously capture frames associated with the current temporal location in the video being rendered which must be decoded in order to obtain the layered video frame data needed to render a view of the scene depicted in the current portion of the video from a particular user selected vantage point. Should this vantage point coincide with the view of the scene captured by one of the cameras, then only the data associated with that frame need be decoded. However, if the desired viewpoint falls somewhere between the camera views, then the frame data associated with the three or four adjacent cameras must be decoded in order to render the scene from the desired viewpoint.

The particular frame or frames needed to render the scene from the desired vantage point is identified by the rendering module (which will be described next). Once identified, the layered video frame data associated with the identified frame or frames is decoded using the appropriate decoding technique applicable to the type of compression and encoding schemes employed in the previously described compression and file generation modules. In cases where the aforementioned integrated approach is employed as in tested embodiments of the present invention, the decoding is accomplished as described in the co-pending application entitled "A System And Process For Compressing And Decompressing Multiple, Layered, Video Streams Of A Scene Captured From Different Viewpoints Forming A Grid Using Spatial And Temporal Encoding", which was filed on Mar. 31, 2005 and assigned Ser. No. 11/097,533.

In addition to the decoding of frame data from the interactive viewpoint video file, the decoding module also decodes the aforementioned camera calibration data. As indicated previously, this data could be found in the file header or as metadata.

1.3.3.2 Rendering Module

It is the job of the rendering module to first process user input concerning the viewpoint that is desired for the scene to be rendered, and to identify the frame or frames from the group of contemporaneously captured frames associated with the current temporal portion of the video being rendered that are needed to render the desired view. In order to accomplish this task, the rendering module is initialized with the aforementioned camera calibration data contained in the interactive viewpoint video file. This calibration data includes the location and viewpoint information for each of the video cameras used to capture the scene associated with the video being viewed. Given this information the rendering module computes the locations of the camera viewpoints. As described previously, the user is able to specify any viewpoint on the surface formed by the camera viewpoints, with the outside perimeter of the surface representing the endpoints of the possible viewpoint selections. As discussed above, the selected viewpoint can coincide with the view of the scene captured by one of the cameras (or alternately the view synthesized from a virtual camera position). In such a case only the "current" frame associated with that camera is identified as being needed to render the desired view. However, the usual case will be that the viewpoint falls between the viewpoints of adjacent cameras. In this latter case, the rendering module identifies current frames associated with three of these adjacent cameras in one embodiment and four of them in an alternate embodiment.

As for the user input, this information can be obtained in any appropriate conventional manner, such as via a user interface of some type used to input and process user viewpoint selections. For example, this interface can include a graphics user interface (GUI) that is presented to the user on a display device (e.g., computer monitor, display screen, 3D goggles, among others). This GUI would include some graphic arrangement that allows the user to indicate the viewpoint, among the possible viewpoints, from which he or she wants to view the scene captured in the video for the current portion of the video being rendered. The user can change the desired viewpoint as the video plays as well. These selections would be made by the user interfacing with the GUI using any standard input device (e.g., mouse, joystick, eye tracking device, among others).

Once the frame or frames needed to render the desired view have been identified, the rendering module directs the selective decoding module to decode the needed frame data. The frame data output of the selective decoding module consists of 5 data planes for each frame provided: the main layer color, main layer depth, boundary layer alpha matte, boundary layer color, and boundary layer depth. In the case where the desired viewpoint coincides with one of the camera viewpoints, only the main layer and boundary layer data planes of that camera are used to reconstruct the scene. However, in the case where the desired viewpoint falls between the camera viewpoints, the rendering process is more involved. In one embodiment of the present rendering module where data from two camera viewpoints is required to render a view of the scene from the user specified viewpoint, the main and boundary layer data from each camera are projected to the desired viewpoint. This can be accomplished using conventional rendering methods and the camera calibration data provided in the interactive viewpoint video file. The projected main and boundary layers are then blended to generate the final frame. Here again conventional blending methods can be employed with each layer's contribution to the final view being weighted in proportion to how close the associated camera's viewpoint is from the desired viewpoint. The closer the desired viewpoint is to an adjacent camera's viewpoint, the more heavily the projected layer associated with that camera viewpoint is weighted.

While conventional view-projection and rendering techniques can be employed to accomplish the foregoing rendering task, tested embodiments of the present invention employed a new approach. This new approach is the subject of a co-pending application entitled "A Real-Time Rendering System And Process For Interactive Viewpoint Video That Was Generated Using Overlapping Images Of A Scene Captured From Viewpoints Forming A Grid" by the inventors of this application and assigned to the common assignee. The co-pending application was filed on Mar. 31 2005 and assigned Ser. No. 11/097,549. It is further noted that the foregoing rendering process can be accomplished using graphics processing units, software rendering techniques, or both.

As indicated previously, the preferred mode of operation of the foregoing interactive viewpoint video generation program is to employ image-based representations of a captured scene. However, it is not beyond the scope of the present invention to additionally introduce synthesized elements into the rendered scenes. Thus, in one embodiment of the rendering module (a shown in FIG. 5), 3D object data 508 is input into the rendering module for incorporation into the frame being currently rendered. In one embodiment, this input would include the data necessary to render an animated object or objects from a viewpoint corresponding to the selected viewpoint and locating information for incorporating the object(s) in a pre-established position within the frame being rendered. The object(s) could change shape over time (i.e., so as to have a different appearance in different ones of the rendered frames) or have a static appearance. Further, the position in the rendered frame where the object(s) are incorporated can change with time (i.e., so as to have a different location in different ones of the rendered frames) or can be located in the same place in each successive rendered frame.

Image-based objects can also be inserted into the scene during the rendering process. This can be achieved by first "pulling" a matte of the image-based object using a depth threshold and then inserting the pulled sprite into the original video using z-buffering.

1.3.4 Interactive Viewpoint Video Rendering Process

Figure 6:
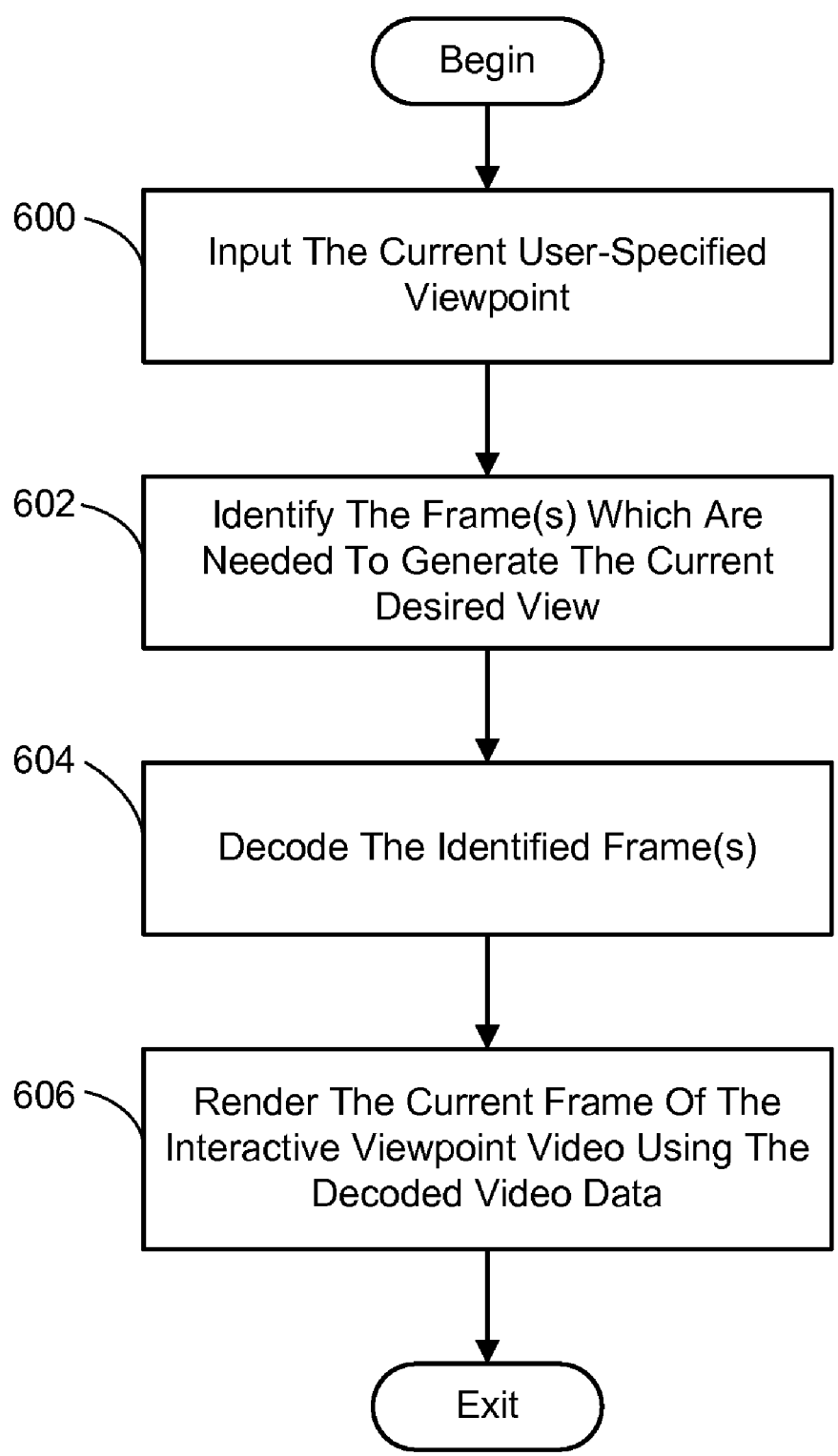
FIG. 6 is a flow chart diagramming one embodiment of the interactive viewpoint video rendering process according to the present invention.

The foregoing rendering program architecture can be employed to perform the following process to render the interactive viewpoint video in one embodiment of the present invention as shown in FIG. 6. Generally, for each frame of the video rendered, the current user-specified viewpoint is first input (process action 600). However, it is noted that instead of inputting the viewpoint each time a new frame of the video is rendered, only changes in the specified viewpoint could be input. In this case, unless a change in viewpoint has been received, it would be assumed the last-specified viewpoint is still valid and would be used in rendering the current frame of the video.

Once the user-specified viewpoint is established, the next process action 602 is to identify the frame or frames from the group of contemporaneously captured input frames associated with the current frame of the video being rendered, which are needed to generate the desired view. The identified frame or frames are then decoded (process action 604).

Next, the current frame of the interactive viewpoint video is rendered using the decoded video data (process action 606). This frame will depict the scene associated with the current temporal portion of the video as seen from the viewpoint currently specified by the user. This may require synthesizing the frame if the desired viewpoint falls between the viewpoints of adjacent cameras used to capture the scene. It is noted that the foregoing process can optionally be modified to also insert computer-generated or image-based objects into the scene during the rendering process as described previously, although this action is not shown in FIG. 6.

2.0 Potential Applications

The interactive viewpoint video system and process can be employed in a variety of interesting applications. At its basic level a user is able to play a video and continuously change their viewpoint as they are watching. Thus, interactive viewpoint video allows users to experience video as an interactive 3D medium. This has a high potential for changing the way dynamic events are watched and enhancing realism of games. Examples of dynamic events of interest are sports events (baseball, basketball, skateboarding, tennis, etc.), instructional videos (how-to videos for golf, martial arts, etc.), and performances (Cirque de Soleil, ballet, modern dance, etc.). Further, if sufficient bandwidth is available, the video could be broadcast or multicast, thus providing a viewing experience that could be described as 3D television.

However, the present invention is not just limited to changing viewpoints while watching the video. It can also be used to produce a variety of special effects such as space-time manipulation. For example a user can freeze the video and view the depicted scene from a variety of viewpoints. A user can also play the video while viewing the depicted scene from one or more viewpoints, and then reverse the video and watch the scene from different viewpoints. Still further the video can be played forward or backward at any speed, while changing viewpoints as desired.

The foregoing features of interactive viewpoint are not only interesting to a casual viewer, but would be particularly useful to the television and film industry. Instead of the painstaking process of determining what part of a scene is to be captured and from what viewpoint ahead of time, with the possibility that most desirable shot would be missed, the system and process of the present invention can be used. For example, a scene would first be captured as an interactive viewpoint video. Then, the filmmaker can view the video and for each shot (even down to a frame-by-frame basis) chose the viewpoint that is desired for the final film. Further, the previously described object insertion feature is also a tool that could be advantageous to the filmmaker. Thus, the techniques presented bring us one step closer to making image-based (and video-based) rendering an integral component of future media authoring and delivery.

3.0 References

[1] Buehler, C., Bosse, M., McMillan, L., Gortler, S. J., and Cohen, M. F. 2001. Unstructured lumigraph rendering. *Proceedings of SIGGRAPH* 2001 (August), 425-432.

[2] Carceroni, R. L., and Kutulakos, K. N. 2001. Multi-view scene capture by surfel sampling: From video streams to non-rigid 3D motion, shape and reflectance. In *Eighth International Confer-ence on Computer Vision (ICCV 2001)*, vol. II, 60-67.

[3] Carranza, J., Theobalt, C., Magnor, M. A., and Seidel, H.-P. 2003. Free-viewpoint video of human actors. *ACM Transactions on Graphics* 22, 3 (July), 569-577.

[4] Chang, C.-L., et al. 2003. Inter-view wavelet compression of light fields with disparity-compensated lifting. In *Visual Communication and Image Processing (VCIP 2003)*.

[5] Chuang, Y.-Y., et al. 2001. A Bayesian approach to digital mat-ting. In *Conference on Computer Vision and Pattern Recognition (CVPR'2001)*, vol. II, 264-271.

[6] Debevec, P. E., Taylor, C. J., and Malik, J. 1996. Modeling and rendering architecture from photographs: A hybrid geometry- and image-based approach. *Computer Graphics (SIGGRAPH'96)* (August), 11-20.

[7] Debevec, P. E., Yu, Y., and Borshukov, G. D. 1998. Efficient view-dependent image-based rendering with projective texture-mapping. *Eurographics Rendering Workshop* 1998, 105-116.

[8] Gortler, S. J., Grzeszczuk, R., Szeliski, R., and Cohen, M. F. 1996. The Lumigraph. In *Computer Graphics (SIGGRAPH'96) Pro-ceedings*, ACM SIGGRAPH, 43-54.

[9] Hall-Holt, O., and Rusinkiewicz, S. 2001. Stripe boundary codes for real-time structured-light range scanning of moving objects. In *Eighth International Conference on Computer Vision (ICCV 2001)*, vol. II, 359-366.

[10] Heigl, B., et al. 1999. Plenoptic modeling and rendering from image sequences taken by hand-held camera. In *DAGM'99*, 94-101.

[11] Kanade, T., Rander, P. W., and Narayanan, P. J. 1997. Virtualized reality: constructing virtual worlds from real scenes. *IEEE Mul-tiMedia Magazine* 1, 1 (January-March), 34-47.

[12] Levoy, M., and Hanrahan, P. 1996. Light field rendering. In *Computer Graphics (SIGGRAPH'96) Proceedings*, ACM SIG-GRAPH, 31-42.

[13] Pulli, K., et al. 1997. View-based rendering: Visualizing real objects from scanned range and color data. In *Proceedings of the 8-th Eurographics Workshop on Rendering*.

[14] Scharstein, D., and Szeliski, R. 2002. A taxonomy and evaluation of dense two-frame stereo correspondence algorithms. *International Journal of Computer Vision* 47, 1 (May), 7-42.

[15] Seitz, S. M., and Dyer, C. M. 1997. Photorealistic scene reconstruction by voxel coloring. In *Conference on Computer Vision and Pattern Recognition (CVPR'97)*, 1067-1073.

[16] Shade, J., Gortler, S., He, L.-W., and Szeliski, R. 1998. Layered depth images. In *Computer Graphics (SIG-GRAPH'98) Proceed-ings*, ACM SIGGRAPH, Orlando, 231-242.

[17] Tao, H., Sawhney, H., and Kumar, R. 2001. A global matching framework for stereo computation. In *Eighth International Con-ference on Computer Vision (ICCV 2001)*, vol. I, 532-539.

[18] Vedula, S., Baker, S., Seitz, S., and Kanade, T. 2000. Shape and motion carving in 6D. In *Conference on Computer Vision and Pattern Recognition (CVPR'2000)*, vol. II, 592-598.

[19] Wexler, Y., Fitzgibbon, A., and Zisserman, A. 2002. Bayesian estimation of layers from multiple images. In Seventh European Conference on Computer Vision (ECCV 2002), vol. III, 487-501.

[20] Wilburn, B., Smulski, M., Lee, H. H. K., and Horowitz, M. 2002. The light field video camera. In *SPIE Electonic Imaging: Media Processors*, vol. 4674, 29-36.

[21] Yang, J. C., Everett, M., Buehler, C., and McMillan, L. 2002. A real-time distributed light field camera. In *Eurographics Workshop on Rendering*, P. Debevec and S. Gibson, Eds., 77-85.

[22] Zhang, Y., and Kambhamettu, C. 2001. On 3D scene flow and structure estimation. In *Conference on Computer Vision and Pattern Recognition (CVPR'2001)*, vol. II, 778-785.

[23] Zhang, L., Curless, B., and Seitz, S. M. 2003. Spacetime stereo: Shape recovery for dynamic scenes. In *Conference on Computer Vision and Pattern Recognition*, 367-374.

[24] Zhang, Z. 2000. A flexible new technique for camera calibration. *IEEE Transactions on Pattern Analysis and Machine Intelligence* 22, 11, 1330-1334.

Wherefore, what is claimed is:

1. A computer-implemented process for generating an interactive viewpoint video, comprising using a computer to perform the following process actions:
inputting three or more synchronized video streams each depicting a portion of the same scene captured from different viewpoints, wherein said viewpoints form an array;
inputting calibration data defining geometric and photometric parameters associated with each video stream; and
for each group of contemporaneous frames from the synchronized video streams,
generating a 3D reconstruction of the scene,
using the reconstruction to compute a disparity map for each frame in the group of contemporaneous frames, and
for each frame in the group of contemporaneous frames,
identifying areas of significant depth discontinuities based on its disparity map,
identifying background pixel information and foreground pixel information for pixels in said areas of significant depth discontinuities,
generating a main layer comprising pixel information associated with areas in the frame that do not exhibit depth discontinuities exceeding a prescribed threshold and the background pixel information from areas having depth discontinuities above the threshold,
generating a boundary layer comprising the foreground pixel information associated with areas having depth discontinuities that exceed the threshold, to produce a layered representation for the frame under consideration, and
storing the main layer and boundary layer in a computer readable medium that has a physical form.

2. The process of claim 1, further comprising an action of using the reconstruction to compute correspondences across all camera views.

3. The process of claim 1, further comprising a process action of compressing the layered representations generated for the frames of the interactive viewpoint video to facilitate transfer and/or storage of the video.

4. The process of claim 1, further comprising a process action of generating an interactive viewpoint video file comprising the layered representations generated from frames of the inputted video streams and said calibration data.

5. The process of claim 1, wherein the process action of generating a 3D reconstruction of the scene comprises an action of employing a segmentation-based reconstruction technique.

6. The process of claim 1, wherein the process action of generating the main layer comprises an action of establishing the color and depth of each pixel in the layer, and wherein the process action of generating the boundary layer comprises an action of establishing the color, depth and opacity of each pixel in the layer.

7. The process of claim 1, wherein the process action of generating the boundary layer comprises an action of dilating the layer to encompass a prescribed number of pixels adjoining the pixels exhibiting depth discontinuities that exceed the threshold.

8. A system for generating an interactive viewpoint video, comprising:
a video capture sub-system comprising,
three or more video cameras for capturing multiple video streams each depicting a portion of the same scene captured from different viewpoints which form an array,
synchronization equipment for synchronizing the video streams to create a sequence of groups of contemporaneously captured video frames each depicting a portion of the same scene,
one or more general purpose computing devices;
a first computer program having program modules executable by at least one of said one or more general purpose computing devices, said modules comprising, a camera calibration module for computing geometric and photometric parameters associated with each video stream; and
a second computer program having program modules executable by at least one of said one or more general purpose computing devices, said modules comprising,
a 3D reconstruction module which generates a 3D reconstruction of the scene depicted in each group of contemporaneous frames from the synchronized video streams, and which uses the reconstruction to compute a disparity map for each frame in the group of contemporaneous frames,
a matting module which, for each frame in each group of contemporaneous frames, identifies areas of significant depth discontinuities based on the frame's disparity map, and
a layered representation module which, for each frame in each group of contemporaneous frames,
identifies background pixel information and foreground pixel information for pixels in said areas of significant depth discontinuities,
generates a main layer comprising pixel information associated with areas in the frame that do not exhibit depth discontinuities exceeding a prescribed threshold and the background pixel information from pixels in areas having depth discontinuities exceeding the threshold, and
generates a boundary layer comprising the foreground pixel information associated with areas having depth discontinuities that exceed the threshold, to produce a layered representation for the frame under consideration.

9. The system of claim 8, wherein a field of view of each camera overlaps the field of view of any adjacent camera by a prescribed amount.

10. The system of claim 8, wherein the array of camera viewpoints is a rectangular array having one of (i) regularly-spaced viewpoints and (ii) irregularly-spaced viewpoints.

11. The system of claim 8, wherein the array of camera viewpoints is a triangular array having one of (i) regularly-spaced viewpoints and (ii) irregularly-spaced viewpoints.

12. The system of claim 8, wherein the video capture sub-system further comprises storage equipment for storing the video streams prior to processing.

13. The system of claim 8, wherein the second computer program further comprises a compression program module for compressing the layered representations generated for the frames of the interactive viewpoint video to facilitate transfer and/or storage of the video.

14. The system of claim 8, wherein the second computer program further comprises an interactive viewpoint video file generation program module for creating a file comprising the layered representations generated from frames of the inputted video streams and the output of the calibration module.

15. A computer-implemented process for rendering and displaying an interactive viewpoint video from data comprising layered representations of video frames generated from sequential groups of contemporaneously input video frames each depicting a portion of the same scene and exhibiting different viewpoints which form an array, and comprising calibration data comprising geometric parameters and photometric parameters associated with the capture of each video frame, said process comprising using a computer to perform the following process actions for each frame of the interactive viewpoint video to be rendered:
identifying a current user-specified viewpoint;
identifying the frame or frames from a group of contemporaneously captured frames corresponding with a current temporal portion of the video being rendered that are needed to render the scene depicted therein from the identified viewpoint;
inputting the layered representations of the identified video frame or frames; and
rendering and displaying the frame of the interactive viewpoint video from the viewpoint currently specified by the user using the inputted layered frame representations; wherein,
background pixel information and foreground pixel information have been identified for pixels in areas of each input frame that have significant depth discontinuities, and
the layer representation of each input frame comprises,
a main layer comprising pixel information associated with areas in the frame that do not exhibit depth discontinuities exceeding a prescribed threshold and the background pixel information from areas of depth discontinuities above the threshold, and
a boundary layer comprising the foreground pixel information associated with areas having depth discontinuities that exceed the threshold.

16. The process of claim 15, wherein the video frame data is compressed, and wherein process action of inputting the layered representations of the identified video frame or frames, comprises an action of decoding the portion of the video frame data necessary to obtain the layered representations of the identified video frame or frames.

17. The process of claim 15, wherein the process action of identifying the frame or frames from a group of contemporaneously captured frames corresponding with a current temporal portion of the video being rendered that are needed to render the scene depicted therein from the identified viewpoint, comprises the actions of:
using the calibration data to determine the viewpoints associated with each of the video frames from which the layer representations were generated;
whenever the identified viewpoint coincides with a viewpoint of one of the video frames from which the layer representations were generated, identifying that frame as the only frame needed to render the scene; and
whenever the identified viewpoint falls between the viewpoints of the video frames from which the layer representations were generated, identifying a prescribed number of frames whose viewpoints neighbor the identified viewpoint as the frames needed to render the scene.

18. The process of claim 15, wherein the process action of rendering and displaying the frame of the interactive viewpoint video, comprises an action of generating an interactive viewpoint video frame from a prescribed number of input frames of the group of contemporaneously captured frames corresponding with a current temporal portion of the video being rendered whose viewpoints neighbor the identified viewpoint, using the calibration data associated therewith, whenever the identified viewpoint falls between the viewpoints associated with said three input frames.

19. The process of claim 18, wherein the process action of generating an interactive viewpoint video frame from the prescribed number of input frames of the group of contemporaneously captured frames corresponding with a current temporal portion of the video being rendered, comprises the actions of:
for each of the input frames in turn,
projecting the main layer of the input frame under consideration into a view corresponding to the current user-specified viewpoint, and
projecting the boundary layer of the input frame under consideration into the view corresponding to the current user-specified viewpoint;
blending the two resulting sets of projected layers to create a finalized frame of the interactive viewpoint video.

20. The process of claim 19, wherein the process action of blending the resulting sets of projected layers comprises an action of blending the projected layers such that the weight each is given is in direct proportion to how close the viewpoint associated with the input layer used to create the projected layer is to the current user-specified viewpoint.

* * * * *